United States Patent
Symanow et al.

(10) Patent No.: US 9,362,854 B2
(45) Date of Patent: Jun. 7, 2016

(54) ELECTRIC MOTOR CONTROL DURING UNRELIABLE POWER SUPPLY OPERATIONS

(71) Applicant: FORD GLOBAL TECHNOLOGIES, LLC, Dearborn, MI (US)

(72) Inventors: David A. Symanow, Plymouth, MI (US); Joseph S. Witek, Novi, MI (US); Eric M. Rademacher, Royal Oak, MI (US); John T. Bremmer, Ypsilanti, MI (US); Hafiz S. Khafagy, Dearborn, MI (US); Zeljko Deljevic, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 209 days.

(21) Appl. No.: 14/104,082

(22) Filed: Dec. 12, 2013

(65) Prior Publication Data
US 2015/0167374 A1    Jun. 18, 2015

(51) Int. Cl.
| | |
|---|---|
| *E05F 15/695* | (2015.01) |
| *H02P 1/02* | (2006.01) |
| *E05F 15/697* | (2015.01) |
| *B60K 6/48* | (2007.10) |
| *B60L 11/14* | (2006.01) |
| *B60L 11/18* | (2006.01) |
| *B60W 10/06* | (2006.01) |
| *F02N 11/10* | (2006.01) |
| *F02N 11/08* | (2006.01) |

(52) U.S. Cl.
CPC . *H02P 1/029* (2013.01); *B60K 6/48* (2013.01); *B60L 11/14* (2013.01); *B60L 11/1861* (2013.01); *B60W 10/06* (2013.01); *E05F 15/695* (2015.01); *E05F 15/697* (2015.01); *F02N 11/10* (2013.01); *F02N 11/0833* (2013.01); *F02N 2200/063* (2013.01); *F02N 2250/02* (2013.01); *Y02T 10/648* (2013.01); *Y02T 10/70* (2013.01); *Y02T 10/7005* (2013.01); *Y02T 10/705* (2013.01); *Y02T 10/7044* (2013.01); *Y02T 10/7077* (2013.01)

(58) Field of Classification Search
CPC .......... B60J 1/08; E05F 15/695; E05F 15/697
See application file for complete search history.

(56) References Cited

U.S. PATENT DOCUMENTS

| | | | |
|---|---|---|---|
| 5,483,135 A * | 1/1996 | Parks | B60J 7/0573 318/281 |
| 6,158,656 A | 12/2000 | Matsumoto et al. | |
| 7,138,736 B2 | 11/2006 | Yamamoto et al. | |

(Continued)

FOREIGN PATENT DOCUMENTS

GB    2003221 A *   3/1979   ............. E05B 77/48

*Primary Examiner* — Thomas G Black
*Assistant Examiner* — Peter D Nolan
(74) *Attorney, Agent, or Firm* — Frank MacKenzie; MacMillan, Sobanski & Todd, LLC

(57) ABSTRACT

A motor system and a method of operating an electric motor that includes monitoring a voltage of power supplied to the motor by a mircrocontroller located in the motor; storing energy within the motor; detecting if the voltage drops below a nonzero threshold; and if the voltage drops below the threshold, immediately operating the microcontroller with the stored energy to store a state of the motor in non-volatile memory located within the motor, and ceasing operation of the motor. This motor operation may be employed with multiple motors in vehicles where voltage drop may occur during an engine start of a vehicle stop/start event.

18 Claims, 4 Drawing Sheets

(56) References Cited

U.S. PATENT DOCUMENTS

| | | | |
|---|---|---|---|
| 7,164,983 B2* | 1/2007 | Ruettiger | G06F 1/30 701/114 |
| 7,609,017 B2* | 10/2009 | Sugimoto | E05F 15/697 318/280 |
| 7,652,403 B2 | 1/2010 | Sakata | |
| 7,737,653 B2* | 6/2010 | Carmen, Jr. | E06B 9/68 160/238 |
| 7,770,327 B2* | 8/2010 | Noro | E05F 15/695 318/432 |
| 7,800,332 B2* | 9/2010 | Whinnery | E05F 15/40 318/286 |
| 7,839,109 B2* | 11/2010 | Carmen, Jr. | E06B 9/68 318/466 |
| 8,068,960 B2* | 11/2011 | Wagner | E05F 15/695 365/170 |
| 8,190,350 B2 | 5/2012 | Kortschak et al. | |
| 9,081,649 B2* | 7/2015 | Whinnery | G06F 17/00 |
| 2004/0095084 A1* | 5/2004 | Mersch | E05F 15/695 318/62 |
| 2006/0202727 A1* | 9/2006 | Ruettiger | G06F 1/30 327/143 |
| 2006/0254148 A1* | 11/2006 | Noro | E05F 15/695 49/352 |
| 2008/0258666 A1* | 10/2008 | Carmen | E06B 9/68 318/470 |
| 2008/0260363 A1* | 10/2008 | Carmen | E06B 9/68 388/811 |
| 2009/0058347 A1* | 3/2009 | Whinnery | E05F 15/40 318/626 |
| 2009/0121664 A1* | 5/2009 | Sugimoto | E05F 15/697 318/400.09 |
| 2009/0138161 A1* | 5/2009 | Wagner | E05F 15/695 701/49 |
| 2011/0089789 A1 | 4/2011 | Tang et al. | |
| 2011/0320109 A1 | 12/2011 | Polimeno et al. | |
| 2012/0119516 A1 | 5/2012 | Connelly et al. | |
| 2012/0217796 A1* | 8/2012 | Morand | H04L 12/40039 307/9.1 |
| 2013/0262964 A1* | 10/2013 | Winker | G06F 11/1004 714/807 |
| 2014/0121907 A1* | 5/2014 | Whinnery | G06F 17/00 701/49 |

* cited by examiner

ELECTRIC MOTOR CONTROL DURING UNRELIABLE POWER SUPPLY OPERATIONS

BACKGROUND OF INVENTION

The present invention relates to electric motor control, and more particularly to controlling electric motors during times when the electric power supply is unreliable.

Automotive vehicles incorporating a start/stop feature may rely on the main vehicle battery for electrical power during the engine off portion of the start/stop operations. Start/stop is a method of improving vehicle fuel economy by stopping the engine when the vehicle is halted for routine driving events (e.g., stopped at a traffic light). In start/stop, the engine control software stops the engine when the vehicle comes to a halt. The objective of stopping the engine is to improve fuel economy by not burning fuel when the vehicle is stopped and the engine is idling. Once the engine is halted, vehicle electrical devices are powered only by the battery (as opposed to the alternator that is used when the engine is on). When the driver releases the brake and steps on the accelerator, the engine is automatically restarted to allow the vehicle to continue on its way.

This engine restart causes what is called a low voltage event in the vehicle electrical system. When the engine starter motor first engages in order to restart the engine, it draws a large amount of current from the battery. This large current draw results in the battery voltage temporarily dropping to a low level that is several volts lower than it was prior to the engine restart. Even though the low voltage event typically lasts a few hundred milliseconds while the engine is cranking, the low battery voltage may cause many electrical devices in the vehicle to stop working because they no longer have sufficient electrical power to operate. After the engine restarts, voltage is then restored to the electrical system when the starter motor is turned off and the alternator begins operating again. Although, under certain operating conditions, when the power supply voltage to the motors in the vehicle is restored, the motors experience an in-rush of electrical current. If multiple motors in the vehicle simultaneously restart, they may (together) draw sufficient current to continue to disrupt the power supply voltage in the vehicle for a short period beyond the starter motor operation.

Electrical motors in the vehicle may be significantly affected by such low voltage events. When the motors are subjected to the low voltage associated with the start/stop event, the operation of the motors, and any operation they were in the middle of, may be affected. For example, a power window motor may have been in the process of opening or closing a window during the engine restart. During engine restart, the motors may momentarily stop working. Also, the motors may not "remember" what they were doing prior to the low voltage event. For example, motors in some subsystems (e.g., power windows) will not remember the direction in which they were operating (e.g., up or down) if power is interrupted or will lose track of their position within their range of movement. The management of electrical motors during start/stop events may have a significant impact on the customer perception of the start/stop feature.

For example, if this motor behavior is left uncorrected, the customer may experience vehicle functions that employ motors that halt during start/stop engine restarts, requiring the customer to manually restart the motor. Some features (e.g., power windows) may stop operation at some point in their range of travel, with the customer needing to perform a special operation to recalibrate the motor position. This motor behavior potentially leads to increased customer dissatisfaction with the vehicle start/stop function.

In addition, in general, this adverse motor behavior may increase as the battery ages, since aged batteries may be less able to support the electrical system load during the restart operations. As the customers notice that the behavior of some electrical features deteriorate over time, they may return the vehicles for service.

As a consequence of this motor behavior during start/stop operations, start/stop electrical systems attempt to employ hardware and software to mitigate the adverse behavior of motors during start/stop engine restart. One attempted solution is the use external electronic modules to control the motors. The external electronic modules basically perform two functions, monitor the operation of the motors and monitor the power supply voltage in the vehicle. When a low voltage event occurs and the motors are operating, the modules store information needed to remember the direction of motor travel and the location of the motor within the range of travel. When the low voltage event has passed, they reactivate the motors as is appropriate.

In some instances, the external electronic modules intercept customer requests to activate the motors (e.g., button presses). The modules then decide, based on vehicle status, whether the motors can operate without risking potential engine restarts. For example, if the battery state of health is low, in some circumstances the modules may request the engine to restart before the windows are allowed to move. This ensures that the in-rush current associated with activation of the windows will not coincide with the starter in-rush current, thereby assuring adequate battery voltage for a successful restart.

The difficulty with employing the external electronic modules is that they can be very costly to implement. For example, when external electronic modules are used for door control modules to control power windows for start/stop purposes, the cost of the modules is several tens of dollars. This increases the cost of including the start/stop feature in vehicles that would otherwise not need such modules. A second concern is that the implementation of these mitigating actions for motor control, discussed above, is that they may significantly increase the complexity of software and design validation testing for the vehicle.

A second attempted solution is to accept the degradation in motor behavior by not adding external modules specifically for motor control. In some instances it may not be practicable (for reasons of cost, complexity, package space, or other factors) to provide an external module for motor control. However, this attempted solution has drawbacks such as motors without external control posing a risk to successful engine restarts if their operation degrades the battery voltage during the restart. Moreover, the potential for such events may increase as the battery ages, the ambient temperature falls, or the vehicle electrical load (for other subsystems) increases.

SUMMARY OF INVENTION

An embodiment contemplates a method of operating a motor comprising: monitoring a voltage of power supplied to the motor by a mircrocontroller located in the motor; storing energy within the motor; detecting if the voltage drops below a nonzero threshold; and if the voltage drops below the threshold, immediately operating the microcontroller with the stored energy to store a state of the motor in non-volatile memory located within the motor, and ceasing operation of the motor.

An embodiment contemplates an electric motor comprising: a housing; power supply located in the housing and configured to store energy; non-volatile memory located in the housing; and a microcontroller located in the housing and configured to monitor a voltage of power supplied to the motor, detect if the voltage drops below a nonzero threshold, and if the voltage drops below the threshold, use the stored energy to store a state of the motor in the non-volatile memory.

An advantage of an embodiment is improved motor behavior for motors in the vehicle during vehicle start/stop engine restart events. The improved motor behavior includes ensuring correct motor operation after motor power supply voltage is interrupted. This improved motor behavior is accomplished while avoiding costs associated with separate external electronic motor controller modules being employed for the motor control. The improved motor operation occurs even with an older battery or in low ambient temperature conditions. An advantage of an embodiment is also that the motors do not operate at times that may interfere with start/stop engine restart events.

DETAILED DESCRIPTION

Figure 1:
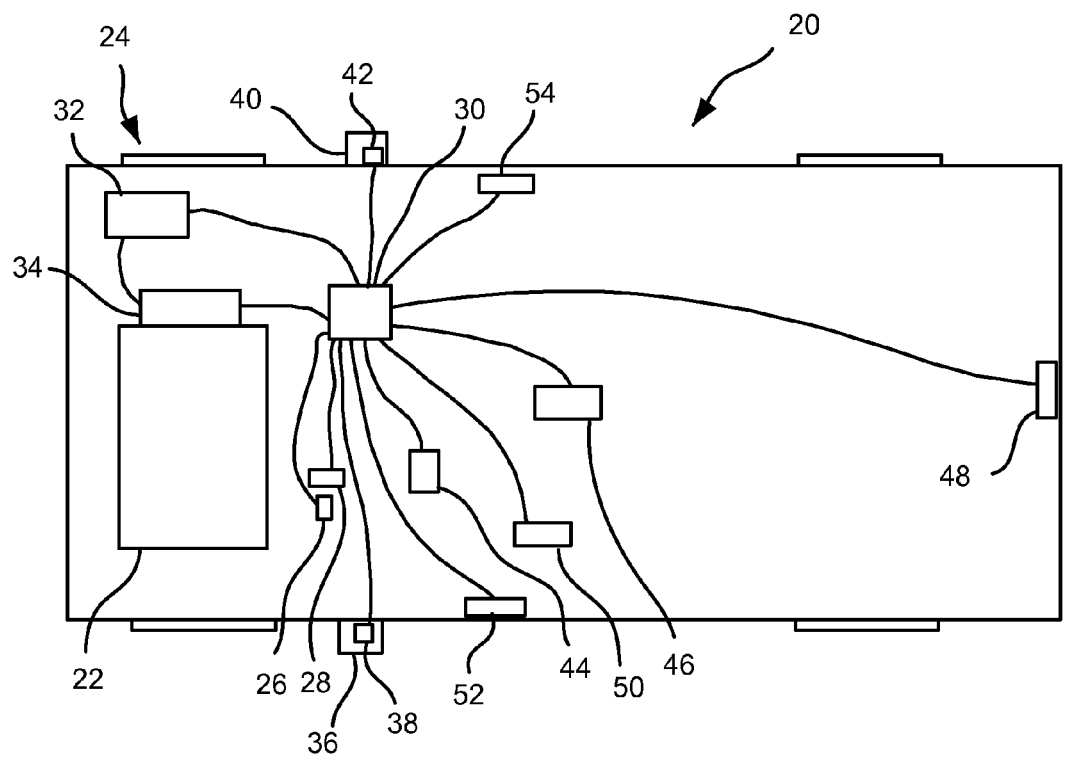
FIG. 1 is a schematic view of a vehicle.

FIG. 1 illustrates a vehicle 20 with an internal combustion engine 22 and a start/stop system 24 in the vehicle 20. The start/stop system 24 operates to improve vehicle fuel economy by stopping the engine 22 when the vehicle 20 is halted for routine driving events (for example, stopped at a traffic light). In start/stop, the engine 22 is automatically turned off when the vehicle 20 comes to a halt and is automatically restarted when a brake pedal 26 is released and an accelerator pedal 28 is pressed. Thus, during the temporary stop operation, the engine 22 cannot drive an alternator to provide a supply of electrical current for vehicle subsystems. The engine 22 is restarted by a controller 30, which controls the start/stop operation, detecting the need to restart the engine 22 and employing a battery 32 and a starter 34 to restart the engine 22.

The vehicle 20 also includes various subsystems that provide occupant convenience features that employ an electric motor to operate. Such subsystems may include, for example, a driver side mirror 36 having an adjustment motor 38, a passenger side mirror 40 having an adjustment motor 42, a windshield wiper system having a wiper motor 44, a sunroof having a sunroof open/close motor 46, a power liftgate having a liftgate motor 48, a driver seat having at least one seat adjustment motor 50, a driver side power window having a window movement motor 52 and a passenger side power window having a window movement motor 54. These motors and subsystems are only examples, and other vehicle subsystems may also include electric motors to operate—such as power sun shades, power steering wheels and other power-adjusted seating. The vehicle motors may be connected to the controller 30 (or other controllers in communication with controller 30). The controller 30 may be made up of various combinations of hardware and software and may be separate controllers in communication with each other as is known to those skilled in the art.

Figure 2:
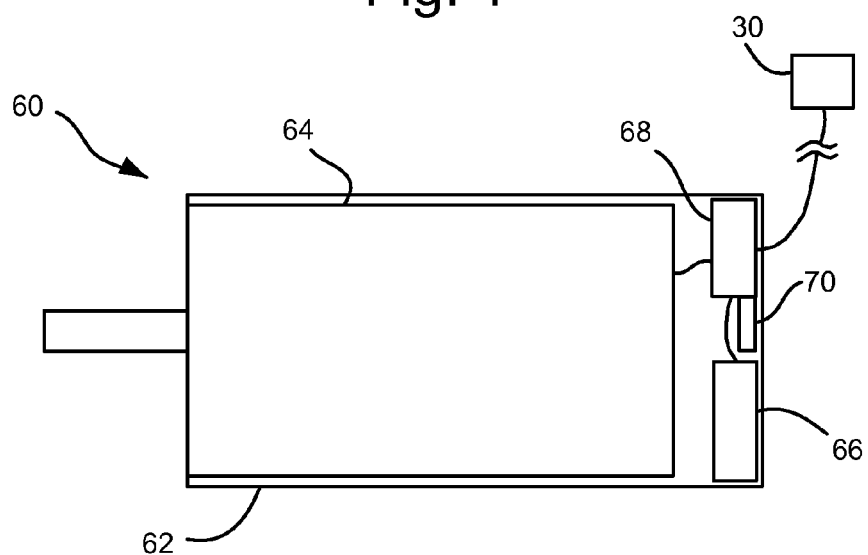
FIG. 2 is a schematic view of an electric motor.

FIG. 2 shows a schematic of an electric motor 60 that may be employed as a motor in or more of at least the above noted examples of vehicle subsystems employing motors. The motor 60 may include a housing 62, within which is located a subassembly of conventional motor components 64 (e.g., stator, rotor, output shaft). Also contained in the housing 62 is a non-volatile memory 66 for storing information relevant to this particular motor 60, a microcontroller 68 for controlling the operation of the motor 60 and which can measure power supply voltage to the motor 60, and power supply circuitry 70, which contains sufficient energy storage to allow the microcontroller 68, when power is interrupted, to continue to operate for a length of time sufficient to store the motor state in the non-volatile memory 66. This motor 60 is in communication with the controller 30 of FIG. 1. Thus, the memory 66, microcontroller 68 and power supply circuitry 70 are incorporated into the motor 60 itself. This allows for the control of motor operation without the use of specific external control modules to control the various motors in the vehicle.

The non-volatile memory 66 may contain information providing the motor operating state when power to the motor 60 was last interrupted (on or off), motor direction of movement when the power was last interrupted (forward or reverse), motor position within its range of travel, a threshold voltage value that determines when low-voltage event operations should be executed, and other context dependent information that ensures the microcontroller 68 properly handles motor control for this motor 60 when power is restored. For example, the context dependent information for a window movement motor 54 (in FIG. 1) may include if window movement motor operation was the result of an auto-reverse operation. The particular context dependent information depends upon what vehicle function the particular motor is associated with.

The microcontroller 68 determines a power supply voltage on a real-time basis. This may be accomplished in various ways, for example, through polling of a register or a low voltage interrupt. The power supply circuitry 70 contains sufficient energy storage to allow the microcontroller 68 to continue to operate, when power is interrupted, to store the motor state in the non-volatile memory 66. Thus, the motor 60 does not need to depend upon vehicle supplied power during a power interruption event. The microcontroller 68 also includes an algorithm for controlling operation of the motor 60, discussed below. The algorithm may be made up of various combinations of hardware and software located within the motor 60 itself.

Figure 3A:
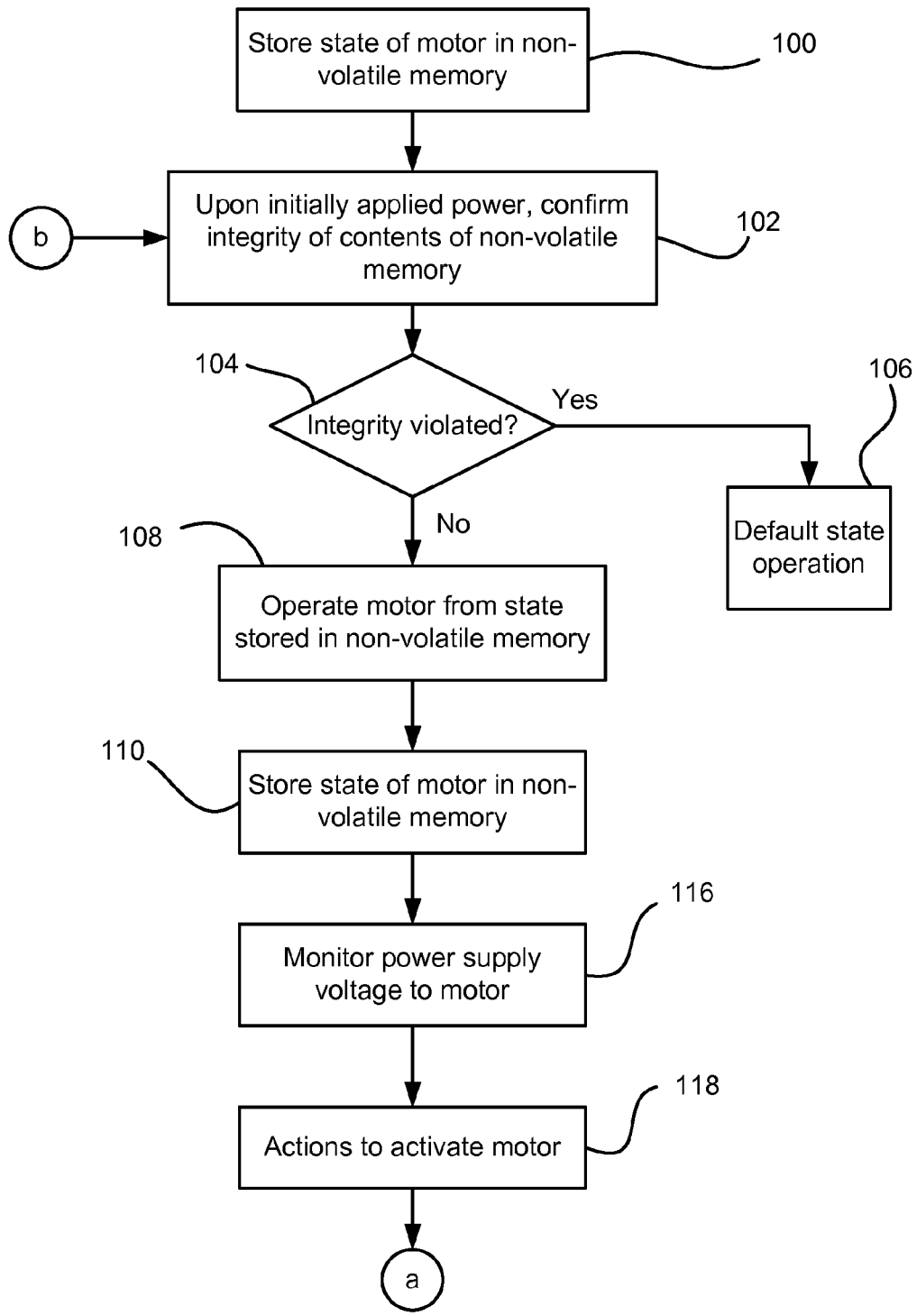
FIGS. 3A and 3B is a flow chart illustrating operation of the motor under vehicle operating conditions.

One state of motor operation is during initial motor power-on or recovery from a reset, which will be discussed with reference to FIGS. 1-3. This assumes that prior to initial motor power-on or recovery from a reset, the microcontroller 68 continuously monitors and stores the state of the motor 60 in the non-volatile memory 66, block 100. When electrical power is initially applied to the motor 60, the microcontroller 68 confirms the integrity of the contents of the non-volatile memory 66, which may be accomplished, for example, by calculating a checksum, block 102. If the integrity of the non-volatile memory 66 is violated, block 104, the microcontroller 68 operates the motor 60 in a default state, block 106, with the default state being based on the particular vehicle system within which this motor 60 operates. For example, if the particular motor 60 is the adjustment motor 38 for the driver side mirror 36, then the default state may be motor off.

For motors for other vehicle systems, the default state may be something other than a motor off state.

Figure 3B:
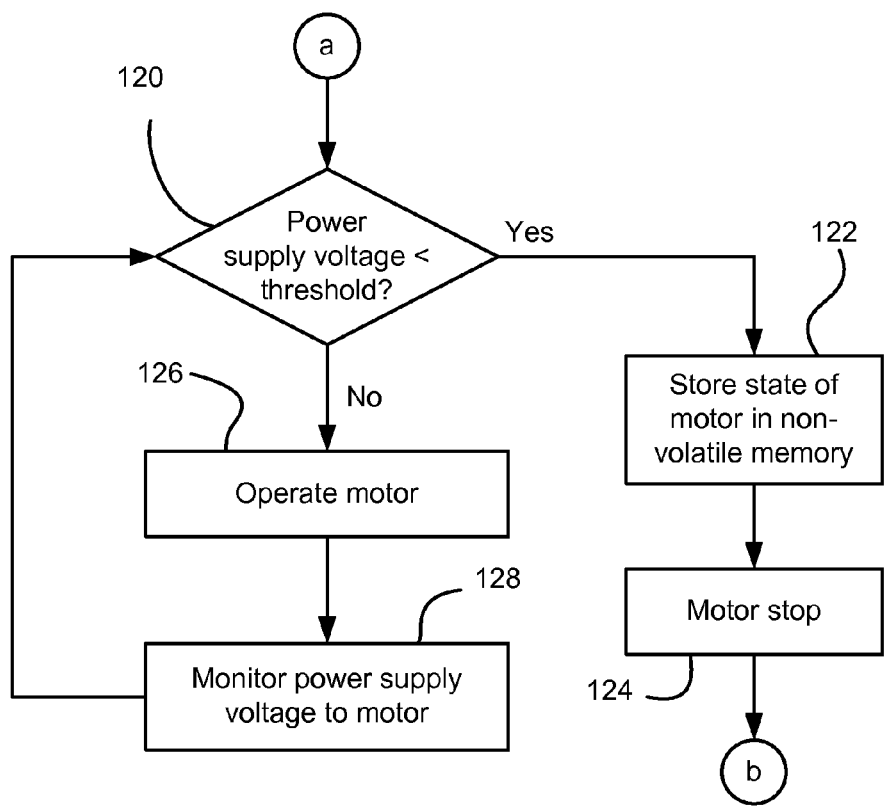
Figure 4:
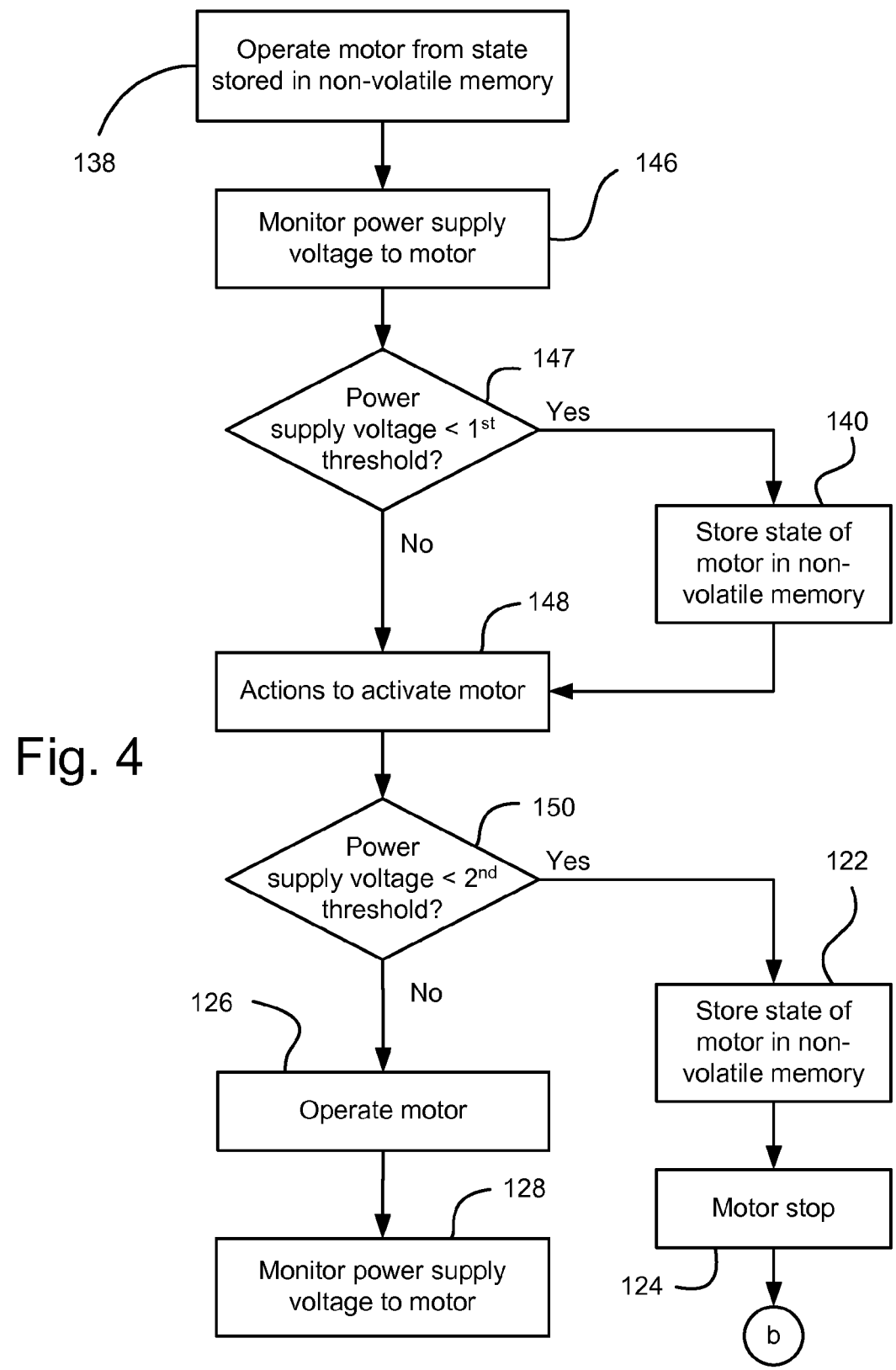
FIG. 4 is a flow chart illustrating an optional way to operate the motor under vehicle operating conditions.

If the integrity of the non-volatile memory 66 is not violated, block 104, the microcontroller 68 operates the motor 60 in the state stored in non-volatile memory 66, block 108. If, for example, the stored state is motor off, the microcontroller 68 does nothing. On the other hand, if, for example, the stored state is motor on, the microcontroller 68 sets the motor direction as indicated in the non-volatile memory 66, obtains the motor position as indicated in the non-volatile memory 66, and turns the motor 60 on to complete the operation being conducted by the motor 60. For example, if the motor 60 is a window movement motor 52 and the motor was moving in the direction to close the window, then the motor direction is set for closing the window, the motor position is set that reflects the position of the window, and the window movement motor 52 is turned on to complete the window closing event. While operating the motor 60 based on the state stored in non-volatile memory 66, block 108, the microcontroller 68 continuously monitors and updates the new state of the motor 60 in the non-volatile memory 66, block 110. The step in block 110 is optional, and, as discussed below, the state of the motor 60 may be stored in the non-volatile memory when the voltage drops below a particular predetermined threshold, as illustrated in FIGS. 3B and 4 below.

The on-going state of motor operation includes the microcontroller 68 monitoring the power supply voltage to the motor 60 in real time, block 116. This occurs while the state of the motor 60 is continuously monitored and stored in the non-volatile memory 66 (if desired). If a vehicle occupant (or an overall controlling subsystem) takes actions to activate the motor 60, block 118, the microcontroller 68 detects if the power supply voltage has dipped below a predetermined threshold, block 120. For example, in a nominal 12 volt battery system, the threshold may be 8.5 volts. The particular threshold given is just an example, and may be different for different combinations of vehicles, powertrains and other factors related to the particular type and model of vehicle.

If the voltage is below the predetermined threshold, then the microcontroller 68 immediately stores to the non-volatile memory 66, block 122, the motor state (operating or not operating), the motor direction of movement (forward or reverse) if operating, the motor location within its range of movement, and any context dependent information for the particular system within which the motor is operating (for example, auto-reverse for a window movement motor); and the motor 60 is stopped (or remains stopped if not moving), block 124. The microcontroller 68 may employ the power stored in the power supply circuitry 70 to allow for storage to the non-volatile memory 66 even when power from the vehicle is not being supplied to the motor 60. Such a condition may occur during a vehicle engine start event when the vehicle 20 is operating in a stop/start mode. Upon vehicle power being restored to the motor 60, the microcontroller 68 returns to block 102 to again initialize the motor 60 for operation.

If the voltage is not below the predetermined threshold, then the motor 60 is operated to perform the requested function for the particular system the motor 60 is associated with, block 126. While operating, the microcontroller 68 continues monitoring the power supply voltage to the motor 60 in real time, block 128, taking the steps above if the voltage drops below the predetermined threshold, block 120.

FIG. 4 illustrates an optional way to operate the motor 60, and will be discussed relative to FIGS. 1-4. The operation is similar to the motor operation of FIG. 3 and may be part of the steps of the process of FIG. 3, but the on-going state of motor operation may be modified to include the microcontroller 68 monitoring the power supply voltage to the motor 60 in real time, with the process employing an additional voltage threshold.

For example, the motor 60 may be operated (as in block 108) from a state stored in non-volatile memory, block 138. Then, rather than automatically continuously storing the state of the motor 60 in non-volatile memory (as in block 110), the power supply voltage to the motor is monitored (as in block 116), block 146. If the power supply voltage is less than a first voltage threshold, block 147, then the microcontroller 68 begins to continuously update the non-volatile memory 66, block 140. If not, then the non-volatile memory 66 is not continuously updated.

If a vehicle occupant (or an overall controlling subsystem) takes actions to activate the motor 60 (as in block 118), block 148, the microcontroller 68 detects if the power supply voltage has dipped below a second predetermined voltage threshold, block 150. The second threshold is a lower voltage than the first threshold. If it has dropped below the second threshold, then steps 122 and 124 of FIG. 3 are carried out. If not, then steps 126 and 128 of FIG. 3 are carried out. In essence, the processes of FIGS. 3 and 4 are similar, but the process of FIG. 4 allows for the microcontroller 68 to update the non-volatile memory 66 less overall since most of the time the voltage will be above both voltage thresholds.

As an additional option, a third voltage threshold may be employed to determine when the motor 60 is turned back on after a low voltage event or a microcontroller reset, with this occurring when the voltage is above the third threshold. This third threshold may allow for a measure of hysteresis in the operation of the motor 60.

Another option for the process of controlling the motor 60 may be that, after a motor stop, blocks 124 in FIGS. 3B and 4, the microcontroller 68 for each motor 60 may employ a time delay that varies the time at which each particular motor in the vehicle is restarted after a low voltage event. The time delays may be staggered across the different motors in the vehicle to mitigate the possibility of motor inrush current immediately following a low voltage event. This may avoid multiple motors in the vehicle restarting at the same time after a low voltage event, for example after engine restart during a stop/start event. These delays may be in the range of, for example, tens or hundreds of milliseconds.

For particular motors, the length of the delay may also be based on the information that is stored in that particular motor's non-volatile memory. For example, in the window movement motor 52, if the motor restart is based on an auto-reverse event, then the delay should be as short as possible in order to free the obstruction in the path of the window that caused the reversal of the window motion. The motor 52 being in an auto-reverse event is information that is obtainable from the non-volatile memory 66 for that particular motor 52. However, if the window movement motor 52 was undergoing normal window movement before motor stoppage due to a low voltage event, then a time delay may be employed to minimize the number of motors on the vehicle starting at the same time after the low voltage event.

While certain embodiments of the present invention have been described in detail, those familiar with the art to which this invention relates will recognize various alternative designs and embodiments for practicing the invention as defined by the following claims.

What is claimed is:

1. A method of operating an electric motor comprising:
monitoring a voltage of power supplied to the motor by a mircrocontroller located in the motor;
storing energy within the motor;
detecting if the voltage drops below a nonzero threshold;
if the voltage drops below the threshold, immediately operating the microcontroller with the stored energy to store a state of the motor in non-volatile memory located within the motor, and ceasing operation of the motor;
detecting if the voltage drops below a second threshold, the second threshold being a higher voltage than the threshold; and if the voltage is detected as being between the threshold and the second threshold continuously updating the storing of the state of the motor in the non-volatile memory during operation of the motor.

2. The method of claim 1 wherein the state of the motor stored in the non-volatile memory includes a position of the motor.

3. The method of claim 1 wherein the state of the motor stored in the non-volatile memory includes a direction of rotation of the motor.

4. The method of claim 1 wherein if the motor ceases operation due to the voltage dropping below the threshold, upon resupplying power to the motor, the microcontroller restarts operating the motor only after the voltage exceeds a third threshold, the third threshold being higher than the threshold.

5. The method of claim 1 wherein if the motor ceases operation due to the voltage dropping below the threshold, upon resupplying power to the motor, the microcontroller confirms an integrity of the stored state of the motor in the non-volatile memory, and if the integrity is detected as unsatisfactory, operating the motor in a default state operation.

6. The method of claim 1 wherein if the motor ceases operation due to the voltage dropping below the threshold, upon resupplying power to the motor, the microcontroller confirms an integrity of the stored state of the motor in the non-volatile memory, and if the integrity is detected as satisfactory, beginning operation of the motor based on the state of the motor stored in the non-volatile memory.

7. The method of claim 1 wherein if the motor ceases operation due to the voltage dropping below the threshold, upon resupplying power to the motor, the microcontroller delays restarting the motor for a predetermined time period in order to avoid restarting the motor simultaneously with a second motor.

8. The method of claim 1 wherein if the motor ceases operation due to the voltage dropping below the threshold, upon resupplying power to the motor, the microcontroller delays restarting the motor for a time period that varies based on the state of the motor stored in the non-volatile memory prior to the voltage drop.

9. The method of claim 1 wherein the motor is a window movement motor in a vehicle and if the motor ceases operation due to the voltage dropping below the threshold, upon resupplying power to the motor, the microcontroller delays restarting the motor for a first time period based on the stored state of the motor in the non-volatile memory including an indication of a window autoreversal and for a second time period, shorter than the first time period, based on the stored state of the motor in the non-volatile memory including an indication of a window non-autoreversal state of the motor.

10. The method of claim 1 wherein the motor actuates a mechanism in a vehicle and the voltage drop below the threshold occurs during an engine restart of a vehicle stop/start event.

11. The method of claim 1 wherein if the motor ceases operation due to the voltage dropping below the threshold, upon resupplying power to the motor, the microcontroller restarts operating the motor only after the voltage exceeds the second threshold.

12. An electric motor comprising:
a housing;
power supply located in the housing and configured to store energy;
non-volatile memory located in the housing;
a microcontroller located in the housing and configured to monitor a voltage of power supplied to the motor, detect if the voltage drops below a nonzero threshold, and if the voltage drops below the threshold, use the stored energy to store a state of the motor in the non-volatile memory; and wherein the microcontroller is further configured to detect if the voltage drops below a second threshold, the second threshold being a higher voltage than the threshold; and if the voltage is detected as being between the threshold and the second threshold continuously updating the storing of the state of the motor in the non-volatile memory during operation of the motor.

13. The motor of claim 12 wherein the microcontroller is further configured to operate such that if the motor ceases operation due to the voltage dropping below the threshold, upon resupplying power to the motor, the microcontroller confirms an integrity of the stored state of the motor in the non-volatile memory, and if the integrity is detected as unsatisfactory, operates the motor in a default state operation.

14. The motor of claim 12 wherein the microcontroller is further configured to operate such that if the motor ceases operation due to the voltage dropping below the threshold, upon resupplying power to the motor, the microcontroller delays restarting the motor for a time period that varies based on the state of the motor stored in the non-volatile memory prior to the voltage drop.

15. The motor of claim 12 wherein the motor operatively engages a mechanism in a vehicle having an engine, and the voltage drop below the threshold occurs during an engine restart of a vehicle stop/start event.

16. The motor of claim 12 wherein the state of the motor stored in the non-volatile memory includes a position of the motor.

17. The motor of claim 12 wherein the state of the motor stored in the non-volatile memory includes a direction of rotation of the motor.

18. A method of operating an electric motor comprising:
monitoring a voltage of power supplied to the motor by a mircrocontroller located in the motor;
storing energy within the motor;
detecting if the voltage drops below a nonzero threshold;
if the voltage drops below the threshold, immediately operating the microcontroller with the stored energy to store a state of the motor in non-volatile memory located within the motor, and ceasing operation of the motor;
wherein the motor is a window movement motor in a vehicle and if the motor ceases operation due to the voltage dropping below the threshold, upon resupplying power to the motor, the microcontroller delays restarting the motor for a first time period based on the stored state of the motor in the non-volatile memory including an indication of a window autoreversal and for a second time period, shorter than the first time period, based on the stored state of the motor in the non-volatile memory including an indication of a window non-autoreversal state of the motor.

* * * * *